Patented July 20, 1948

2,445,626

UNITED STATES PATENT OFFICE 2,445,626

PROCESS FOR PREPARING ALKYLAMINO-KETONE OXIMES

Glen H. Morey, Terre Haute, Ind., assignor to Commercial Solvents Corporation, Terre Haute, Ind., a corporation of Maryland No Drawing. Application December 4, 1944, Serial No. 566,641

3 Claims. (Cl. 260—566)

This invention relates to oximes of alkylaminoketones in which the alkyl group contains at least 10 carbon atoms, and to a method for preparing alkyl-aminoketone oximes.

Alkylaminoacetone oximes in which the alkyl group is a lower alkyl member, are known and have been prepared by reacting chloroacetone with lower alkylamine and then reacting the product with hydroxylamine (Ber., 28, 2224, and Ber., 29, 868).

I have now found the oximes of alkylaminoketones can be prepared by reacting chloroketone oximes with alkylamines. The oximes in which the alkyl groups are derived from a higher fatty acid have been found to possess outstanding utility as cation active softeners, as described in my copending application Serial No. 566,642, now United States Patent No. 2,402,767. This property is entirely lacking in the lower members. Both higher and lower members may be prepared according to the process of my invention.

The oximes of alkylaminoketones of my invention have the following general formula:

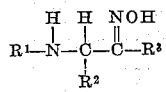

wherein $R^1$ is an alkyl radical having at least 10 carbon atoms, $R^2$ may be hydrogen or methyl and $R^3$ may be methyl or ethyl radicals.

Among the compounds included by the above formula there may be mentioned decylaminoacetone oxime; undecylaminoacetone oxime; dodecylaminoacetone oxime; tridecylacetone oxime; hexadecylaminoacetone oxime; octadecylaminoacetone oxime; dodecylaminomethylethylketone oxime; α(dodecylamino)ethylmethylketone oxime; α(dodecylamino)ethylethylketone oxime, and the like.

The chloro ketones which may be used in carrying out my invention include the chlorinated compounds of acetone or dimethyl ketone; methyl ethyl ketone, and diethyl ketone.

In accordance with my invention, I carry out the reaction between chloroketone oxime and an alkylamine in an aqueous medium. And when preparing the higher alkyl compounds, the higher alkylamine is preferably first converted to paste form to facilitate smooth reaction with the chloroketone oxime. The higher alkylamine paste may be prepared by melting the alkylamine and if desired adding thereto a small amount of an emulsifying agent, for example, a small portion of some previously prepared alkylaminoketone oxime or any suitable emulsifying agent. Hot water is then added to the melted amine and the mixture is stirred vigorously while cooling. If the paste tends to become thick while cooling, a small portion of alcohol may be added to keep it fluid and produce a more easily stirred, more homogeneous mass. The paste is cooled, for example, to room temperature (about 20–25° C.) and the chloroketone oxime, diluted, if desired, with alcohol to prevent caking of the product, is added slowly or portionwise while stirring thoroughly. The product is a smooth white paste, readily dispersible in water and possessing cation-softening activity towards fabrics and the like described in my copending application above referred to.

The product prepared as described above is in the form of its hydrochloride, and as such is readily utilizable as a cation-active softener material.

If it is desirable to isolate the product as the free amine, a large excess of long chain alkylamine is used over the stoichiometric equivalent to react with the chloroketone oxime, and this excess amine then reacts with the chlorine to form the chloride of the excess amine thus liberating the alkylaminochloroketone oxime as the amine. Or if the use of a large excess of alkylamine is undesirable for any reason, the free amine may be liberated by treatment with aqueous alkali.

In preparing the oximes of my invention the alkylamine and chloroketone oxime may be reacted in substantially equimolecular proportions. However, I prefer to utilize at least a small excess of amine in order to insure substantially complete reaction of the chloroketone oxime. Otherwise, the reaction product has a tendency to darken due to decomposition or polymerization of the chloroketone oxime.

The amines which can be used to prepare the alkylaminoketone oximes of my invention include primary amines such as undecylamine, dodecylamine, tridecylamine, tetradecylamine, hexadecylamine, octadecylamine either as the pure products or as mixtures of amines, such as the amines derivable from the higher fatty acids from coconut oil, from fish oils and the like.

The product may be utilized in the form of its hydrochloride directly as formed, as described above, or it may be hydrolyzed to the free amine. However, I find it convenient to utilize the product in the form of the hydrochloride as in this form it has equally effective cation active properties as does the free amine.

The following examples further illustrate my invention.

Example I

A quantity equal to 67 parts of octadecylamine was melted in a reaction vessel. A small amount of octadecylaminoacetone oxime sufficient to serve as an emulsifying agent was dissolved in 250 parts of hot water and this was added to the melted octadecylamine. The solution was stirred vigorously and was allowed to cool while stirring. The small amount of octadecylaminoacetone oxime caused the paste to be more homogeneous than it would otherwise have been. When the paste had cooled to about 45° C., 25 parts of ethyl alcohol was stirred in, and as a result, the paste became more fluid so that it could be stirred more easily and resulted in better homogeneity. The mixture was cooled to atmospheric temperature of about 25° C. and then 30 parts of chloroacetone oxime, diluted with 25 parts of alcohol was added portionwise while stirring thoroughly. The resulting product was a smooth white paste.

Example II

Sixty-seven parts of a mixture of crude long chain amines assaying approximately 84% octadecylamine, the remainder being largely hexadecylamine, were melted with 200 parts of water, 5 parts of an emulsifying agent dissolved in 80 parts of water was added to the amine mixture which was then cooled while stirring rapidly. Then 10 parts of alcohol were stirred in, and 30 parts of chloroacetone oxime dissolved in 20 parts alcohol was added portionwise to the amine paste while stirring rapidly. When the paste was homogeneous the stirring was discontinued and the paste was in suitable form, as the hydrochlorides of the mixed octadecyl- and hexadecylaminoacetone oximes, for use on suitable dilution as a textile softening material.

Example III

Sixty-seven parts of a mixture prepared by mixing C. P. hexadecylamine and C. P. octadecylamine in the proportion of C. P. 25% hexadecylamine and 75% C. P. octadecylamine were melted in a reaction vessel. To the melted amine were added 20 parts of a 25% paste of octadecylaminoacetone oxime dispersed in 90 parts of water. The mixture was allowed to cool and was stirred vigorously while cooling, resulting in a smooth paste. To the above paste was added portionwise a mixture of 30 parts of chloroacetone oxime and 10 parts of alcohol while stirring and further cooling to room temperature of about 25° C. The mixture resulted in a smooth 45% paste which proved to be useful as a textile softener and had the advantage of not causing yellowing of the treated textiles.

While the above describes the preferred embodiments of my invention, it will be understood that departures may be made therefrom within the scope of the specification and claims.

What is claimed is:

1. A process for preparing alkyl aminoketone oximes which comprises reacting in an aqueous medium a chlorinated ketoneoxime of a ketone selected from the group consisting of acetone, methylethylketone and diethylketone with a primary alkyl amine.

2. A process for preparing alkylaminoacetone oximes which comprises reacting in an aqueous medium chloroacetone oxime with a primary alkylamine.

3. A process for preparing octadecylaminoacetone oxime which comprises reacting in an aqueous medium chloroacetone oxime with octadecylamine.

GLEN H. MOREY.

REFERENCES CITED

The following references are of record in the file of this patent:

UNITED STATES PATENTS

| Number | Name | Date |
|---|---|---|
| 2,402,767 | Morey | June 25, 1946 |

OTHER REFERENCES

Chem. Abstracts, 19 (1925), page 2188.
Stoermer et al.: Berichte Deut. Chem. Ges., vol. 28, pages 2224–2227; ibid., vol. 29, pages 863–873.